US010952092B2

(12) United States Patent
Koskinen et al.

(10) Patent No.: US 10,952,092 B2
(45) Date of Patent: Mar. 16, 2021

(54) METHOD AND APPARATUS TO REDUCE SIGNALING OVERHEAD IN THE PRESENCE OF NETWORK OVER-LOAD CONDITION

(75) Inventors: Jussi-Pekka Koskinen, Oulu (FI); Jarkko T. Koskela, Oulu (FI)

(73) Assignee: Nokia Technologies Oy, Espoo (FI)

(*) Notice: Subject to any disclaimer, the term of this patent is extended or adjusted under 35 U.S.C. 154(b) by 414 days.

(21) Appl. No.: 13/983,636

(22) PCT Filed: Dec. 9, 2011

(86) PCT No.: PCT/FI2011/051090
§ 371 (c)(1),
(2), (4) Date: Nov. 12, 2013

(87) PCT Pub. No.: WO2012/107627
PCT Pub. Date: Aug. 16, 2012

(65) Prior Publication Data
US 2014/0056134 A1   Feb. 27, 2014

Related U.S. Application Data

(60) Provisional application No. 61/441,469, filed on Feb. 10, 2011.

(51) Int. Cl.
*H04W 28/02* (2009.01)
*H04W 48/06* (2009.01)
(Continued)

(52) U.S. Cl.
CPC ......... *H04W 28/0247* (2013.01); *H04L 47/11* (2013.01); *H04L 47/26* (2013.01); *H04W 48/06* (2013.01); *H04W 76/18* (2018.02)

(58) Field of Classification Search
CPC .................................................. H04Q 3/0091
See application file for complete search history.

(56) References Cited

U.S. PATENT DOCUMENTS 5,506,839 A * 4/1996 Hatta ..................... H04L 47/10
370/236
2002/0173316 A1* 11/2002 Jang et al. .................... 455/453
(Continued)

FOREIGN PATENT DOCUMENTS

CN       101730033 A    6/2010
CN       101888705 A    11/2010
(Continued)

OTHER PUBLICATIONS

"Delay Tolerant Indication at RRC Connection Establishment", 3GPP TSG RAN WG2 #72bis, R2-110131, Agenda Item: 4.3.2, Jan. 17-21, 2011, pp. 1-5.
(Continued)

*Primary Examiner* — Kibrom T Hailu
*Assistant Examiner* — Bao G Nguyen
(74) *Attorney, Agent, or Firm* — Harrington & Smith

(57) ABSTRACT

A method includes, in response to receiving an overload start indication from a network node, composing and sending first signaling to at least one user equipment to indicate that an overload condition exists for the network node and, in response to receiving an overload end indication from the network node, composing and sending second signaling to the at least one user equipment to indicate that the overload condition no longer exists. A further method includes receiving at a user equipment first signaling from a network access node that indicates that an overload condition exists for a network node and abstaining from making a network access attempt until receiving second signaling from the network access node that indicates that the overload condition no longer exists for the network node. Corresponding apparatus and computer programs are also disclosed.

18 Claims, 4 Drawing Sheets

(51) Int. Cl.
*H04L 12/801* (2013.01)
*H04L 12/825* (2013.01)
*H04W 76/18* (2018.01)

(56) References Cited

U.S. PATENT DOCUMENTS

| | | | |
|---|---|---|---|
| 2007/0178906 A1 | 8/2007 | Gao et al. | 455/453 |
| 2007/0258440 A1* | 11/2007 | Watanabe | H04L 43/00 370/352 |
| 2010/0302950 A1 | 12/2010 | Zhao | |
| 2011/0110228 A1* | 5/2011 | de Franca Lima | H04W 36/22 370/230 |
| 2011/0199905 A1* | 8/2011 | Pinheiro | H04W 4/50 370/235 |
| 2012/0069737 A1* | 3/2012 | Vikberg | H04W 28/12 370/232 |
| 2012/0082029 A1* | 4/2012 | Liao | H04W 76/15 370/230 |
| 2012/0157033 A1* | 6/2012 | Ou | H04W 74/04 455/404.1 |
| 2012/0170503 A1* | 7/2012 | Kelley | H04W 48/06 370/312 |
| 2013/0215742 A1* | 8/2013 | Sirotkin | H04W 28/0247 370/230 |

FOREIGN PATENT DOCUMENTS

| | | |
|---|---|---|
| EP | 2 469 958 A1 | 6/2012 |
| TW | 200509709 A | 3/2005 |
| TW | 200824349 A | 6/2008 |
| WO | 2009096833 A1 | 8/2009 |

OTHER PUBLICATIONS

"Wait Timer for CN Overload Control", 3GPP TSG RAN WG2 Meeting #72bis, R2-110275, Agenda Item: 4.3.2, Jan. 17-21, 2011, pp. 1-3.

"MME/SGSN Overload Control by DL MTC Traffic Throttling", 3GPP TSG SA WG2 Meeting #79E (Electronic), TD S2-103104, Agenda Item: 2.2, Work Item / Release: NIMTC/Rel-10, Jul. 6-13, 2010, 3 pages.

"Rejecting Connection Requests at Partial Signaling Links for the Congestion Control.", 3GPP TSG SA WG2 Meeting #79E (Electronic), TD S2-103115, Agenda Item: 2.2, Work Item / Release: NIMTC/Release 10, Jul. 6-13, 2010, pp. 1-4.

"Solution for Congestion Control for MTC Mobile Terminating Communication", 3GPP TSG SA WG2 Meeting #79E, TD S2-103120, Agenda Item: 2.2, Work Item / Release: NIMTC/ Rel-10, Jul. 6-13, 2010, pp. 1-4.

"SGSN/MME Overload Control by Accepting Connection Request", 3GPP TSG SA WG2 Meeting #79E, TD S2-103159, Agenda Item: 2.2, Work Item / Release: NIMTC/Rel-10, Jul. 6-13, 2010, pp. 1-5.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 9)", 3GPP TS 36.300, v9.3.0, Mar. 2010, pp. 1-166.

"Discussions on Delay-Tolerant Indicator in RRC Signalling", 3GPP TSG RAN WG2 Meeting #72BIS, R2-110050, Agenda item: 4.3.2, Jan. 17-21, 2011, pp. 1-3.

"Considerations on "RRC Wait Timer"", 3GPP TSG-RAN WG2 #72bis, Tdoc R2-110086, Agenda Item: 4.3.2, Jan. 17-21, 2011, pp. 1-8.

"3rd Generation Partnership Project; Technical Specification Group Services and System Aspects; System Improvements for Machine-Type Communications; (Release 10)", 3GPP TR 23.888, v1.0.0, Jul. 2010, pp. 1-80.

"3rd Generation Partnership Project; Technical Specification Group Radio Access Network; Evolved Universal Terrestrial Radio Access (E-UTRA); Radio Resource Control (RRC); Protocol Specification (Release 10)", 3GPP TS 36.331, v10.0.0, Dec. 2010, pp. 1-276.

"3rd Generation Partnership Project; Technical Specification Group Radio Access Network; Evolved Universal Terrestrial Radio Access (E-UTRA); User Equipment (UE) Procedures in Idle Mode (Release 10)", 3GPP TS 36.304, v10.0.0, Dec. 2010, pp. 1-33.

"3rd Generation Partnership Project; Technical Specification Group Core Network and Terminals; Non-Access-Stratum (NAS) Protocol for Evolved Packet System (EPS); Stage 3 (Release 10)", 3GPP TS 24.301, v10.1.0, Dec. 2010, pp. 1-305.

"3rd Generation Partnership Project; Technical Specification Group Radio Access Network; User Equipment (UE) procedures in Idle Mode and Procedures for Cell Reselection in Connected Mode (Release 9)", 3GPP TS 25.304, v9.3.0, Sep. 2010, pp. 1-50.

"3rd Generation Partnership Project; Technical Specification Group Radio Access Network; Radio Resource Control (RRC); Protocol Specification (Release 10)", 3GPP TS 25.331, v10.2.0, Dec. 2010, pp. 1-1834.

Office action received for corresponding Taiwan Patent Application No. 101101084, dated Jul. 30, 2014, 3 pages of Office Action and 2 pages of Office Action translation Available.

International Search Report and Written Opinion received for corresponding Patent Cooperation Treaty Application No. PCT/IB2011/050350, dated Mar. 9, 2012, 11 pages.

3GPP R2-110104 TSG-RAN WG2 #72bis, "Delay Tolerant Scheme for Extending Wait-Timer", Jan. 17-21, 2010, Dublin Ireland, Chapters 1-3.

3GPP TS 36.300 V8.11.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8). Chapter 19.2.2.12.

"Broadcasting of MTC Access Barring", Sierra Wireless, 3GPP TSG SA WG2 Meeting #79E (Electronic, Jul. 2010, S2-103210, 9 pages.

"Broadcasting of MTC Access Barring", Sierra Wireless, 3GPP TSG SA WG2 Meeting #79E (Electronic), Jul. 2010, S2-103114, 8 pages.

* cited by examiner

METHOD AND APPARATUS TO REDUCE SIGNALING OVERHEAD IN THE PRESENCE OF NETWORK OVER-LOAD CONDITION

RELATED APPLICATION

This application was originally filed as Patent Cooperation Treaty Application No. PCT/FI2011/051090 filed Dec. 9, 2011 which claims priority benefit to U.S. Provisional Patent Application No. 61/441,469, filed Feb. 10, 2011.

TECHNICAL FIELD

The exemplary and non-limiting embodiments of this invention relate generally to wireless communication systems, methods, devices and computer programs and, more specifically, relate to techniques for handling wireless communication system network overload conditions.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
BS base station
D2D device-to-device
DL downlink (eNB towards UE)
eNB E-UTRAN Node B (evolved Node B)
EPC evolved packet core
E-UTRAN evolved UTRAN (LTE)
GUTI globally unique temporary identifier
LTE long term evolution of UTRAN (E-UTRAN)
M2M machine-to-machine
MAC medium access control (layer 2, L2)
MM/MME mobility management/mobility management entity
MTC machine-type communication
NodeB base station
OFDMA orthogonal frequency division multiple access
O & M operations and maintenance
PDCP packet data convergence protocol
PHY physical (layer 1, L1)
Rel release
RLC radio link control
RRC radio resource control
RRM radio resource management
SGW serving gateway
SC-FDMA single carrier, frequency division multiple access
UE user equipment, such as a mobile station, mobile node or mobile terminal
UL uplink (UE towards eNB)
UPE user plane entity
UTRAN universal terrestrial radio access network By way of background, a modern communication system is known as evolved UTRAN (E-UTRAN, also referred to as UTRAN-LTE or as E-UTRA). In this system the DL access technique is OFDMA, and the UL access technique is SC-FDMA.

One specification of interest is 3GPP TS 36.300, V8.11.0 (2009-12), 3rd Generation Partnership Project; Technical Specification Group Radio Access Network; Evolved Universal Terrestrial Radio Access (E-UTRA) and Evolved Universal Terrestrial Access Network (EUTRAN); Overall description; Stage 2 (Release 8), incorporated by reference herein in its entirety. This system may be referred to for convenience as LTE Rel-8. In general, the set of specifications given generally as 3GPP TS 36.xyz (e.g., 36.211, 36.311, 36.312, etc.) may be seen as describing the Release 8 LTE system. More recently, Release 9 versions of at least some of these specifications have been published including 3GPP TS 36.300, V9.3.0 (2010-03).

FIG. 1 reproduces FIG. 4.1 of 3GPP TS 36.300 V8.11.0, and shows the overall architecture of the EUTRAN system (Rel-8). The E-UTRAN system includes eNBs, providing the E-UTRAN user plane (PDCP/RLC/MAC/PHY) and control plane (RRC) protocol terminations towards the UEs. The eNBs are interconnected with each other by means of an X2 interface. The eNBs are also connected by means of an S1 interface to an EPC, more specifically to a MME by means of a S1 MME interface and to a S-GW by means of a S1 interface (MME/S-GW 4). The S1 interface supports a many-to-many relationship between MMEs/S-GWs/UPEs and eNBs.

The eNB hosts the following functions:
functions for RRM: RRC, Radio Admission Control, Connection Mobility Control, Dynamic allocation of resources to UEs in both UL and DL (scheduling);
IP header compression and encryption of the user data stream;
selection of a MME at UE attachment;
routing of User Plane data towards the EPC (MME/S-GW);
scheduling and transmission of paging messages (originated from the MME);
scheduling and transmission of broadcast information (originated from the MME or O & M); and
a measurement and measurement reporting configuration for mobility and scheduling.

In the case of a wireless network overload condition it would be advantageous to halt or limit attempts by mobile devices and terminals (UEs) to access the wireless network. The overload condition could exist in one or both of the core network, e.g., at one or more MMEs, and the radio access network (RAN).

There have been discussions regarding a so-called 'delay tolerant indicator' which could be included in RRC connection request or RRC connection setup complete messages. Based on this indicator the network could reject the access attempts of MTC devices for some certain period of time using what could be referred to as an 'extended wait time'. While this approach is basically targeted to core network overloading, it could potentially also be used for RAN overloading.

In general the delay tolerant indicator could be set so that a device can be handled with low priority if the network is congested. In case CN is overloaded this enables the eNB/RNC to either reject the call at the connection request stage or release the call after the connection is completed.

Some publications that are representative of this proposal include 3GPP TSG RAN WG2 Meeting #72BIS, R2-110050, Dublin, Ireland, 17-21 Jan. 2011, Agenda item: 4.3.2, Source: New Postcom, Title: Discussions on delay-tolerant indicator in RRC signalling; 3GPP TSG-RAN WG2 #72bis, Tdoc R2-110086, Dublin, Ireland, 17-21 Jan. 2011, Agenda Item: 4.3.2, Source: Ericsson, ST-Ericsson, Title: Considerations on "RRC Wait timer"; 3GPP TSG-RAN WG2 #72bis, R2-110104, 17-21 Jan. 2011, Dublin, Ireland, Source: Institute for Information Industry (III), Coiler Corporation, Title: Delay Tolerant Scheme for Extending Wait-timer.

However, this approach is far from optimal as the UE (and possibly some hundreds or even thousands of M2M devices) are allowed to begin establishing the RRC connection which results in wasted effort, and especially wasted signaling, if the RRC connection is not established due to the existence of an overload condition in the wireless network.

In addition there has been a proposal related to further releases of E-UTRAN (e.g., REL-11) to introduce an extended access class barring (EAB) feature that would be limited to MTC devices. The EAB could be used to permit only a partial population of MTC UEs to access the wireless network at a certain point in time. However, this approach would not solve the MME overload problem as it is only targeted towards dealing with RAN overload.

SUMMARY

The foregoing and other problems are overcome, and other advantages are realized, by the use of the exemplary embodiments of this invention.

In a first aspect thereof the exemplary embodiments of this invention provide a method that comprises, in response to receiving an overload start indication from a network node, composing and sending first signaling to at least one user equipment to indicate that an overload condition exists for the network node and, in response to receiving an overload end indication from the network node, composing and sending second signaling to the at least one user equipment to indicate that the overload condition no longer exists.

In another aspect thereof the exemplary embodiments of this invention provide an apparatus that comprises a processor and a memory including computer program code. The memory and computer program code are configured to, with the processor, cause the apparatus, in response to a receipt of an overload start indication from a network node, to compose and send first signaling to at least one user equipment to indicate that an overload condition exists for the network node and, in response to a receipt of an overload end indication from the network node, to compose and send second signaling to the at least one user equipment to indicate that the overload condition no longer exists.

In a further aspect thereof the exemplary embodiments of this invention provide a method that comprises receiving at a user equipment first signaling from a network access node that indicates that an overload condition exists for a network node, and abstaining from making a network access attempt until receiving second signaling from the network access node that indicates that the overload condition no longer exists for the network node.

In yet another aspect thereof the exemplary embodiments of this invention provide an apparatus that comprises a processor and a memory including computer program code. The memory and computer program code are configured to, with the processor, cause the apparatus, in response to a receipt at a user equipment of first signaling from a network access node that indicates that an overload condition exists for a network node, to abstain from making a network access attempt until second signaling is received from the network access node that indicates that the overload condition no longer exists for the network node.

DETAILED DESCRIPTION

Figure 1:
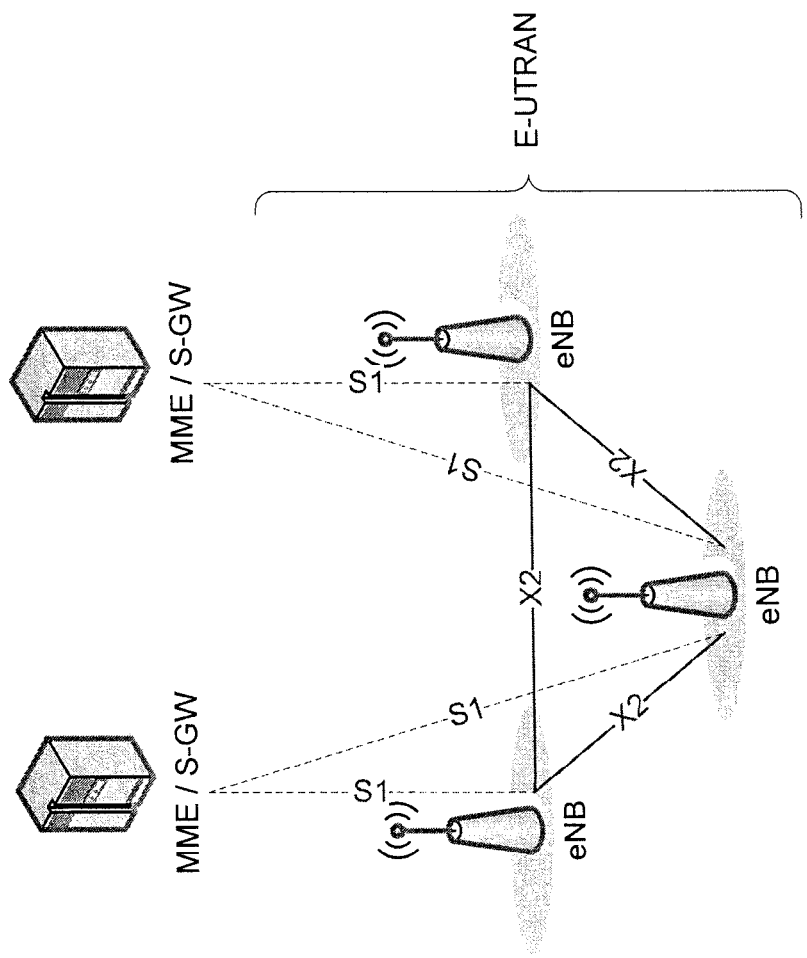
FIG. 1 reproduces FIG. 4.1 of 3GPP TS 36.300, and shows the overall architecture of the EUTRAN system.
Figure 2:
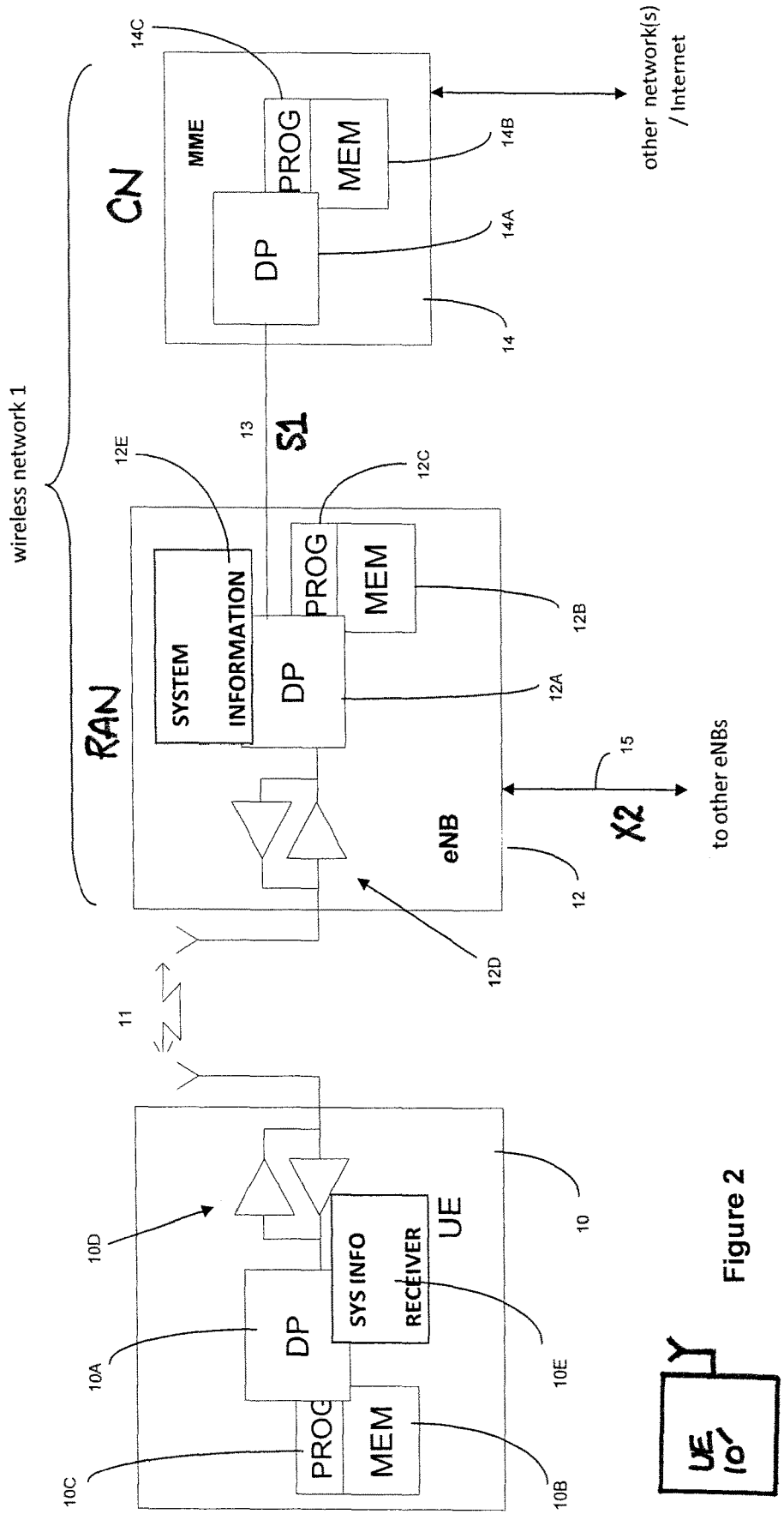
FIG. 2 shows a simplified block diagram of various electronic devices that are suitable for use in practicing the exemplary embodiments of this invention.

Before describing in further detail the exemplary embodiments of this invention, reference is made to FIG. 2 for illustrating a simplified block diagram of various electronic devices and apparatus that are suitable for use in practicing the exemplary embodiments of this invention. In FIG. 2 a wireless network 1 is adapted for communication over a wireless link 11 with an apparatus, such as a mobile communication device which may be referred to as a UE 10, via a network access node, such as a Node B (base station), and more specifically an eNB 12. The network 1 may include a MME 14 shown in FIG. 1, and which can provide connectivity with a further network, such as a telephone network and/or a data communications network (e.g., the internet). The UE 10 includes a controller, such as at least one computer or a data processor (DP) 10A, at least one non-transitory computer-readable memory medium embodied as a memory (MEM) 10B that stores a program of computer instructions (PROG) 10C, and at least one suitable radio frequency (RF) transmitter/receiver pair (transceiver) 10D for bidirectional wireless communications with the eNB 12 via one or more antennas. The eNB 12 also includes a controller, such as at least one computer or a data processor (DP) 12A, at least one computer-readable memory medium embodied as a memory (MEM) 12B that stores a program of computer instructions (PROG) 12C, and at least one suitable RF transceiver 12D for communication with the UE 10 via one or more antennas (typically several when multiple input/multiple output (MIMO) operation is in use). The eNB 12 is coupled via a data/control path 13 to the MME 14. The path 13 may be implemented as the S1 interface shown in FIG. 1. The MME 14 also includes a controller, such as at least one computer or a data processor (DP) 14A, at least one computer-readable memory medium embodied as a memory (MEM) 14B that stores a program of computer instructions (PROG) 14C.

The eNB 12 may also be coupled to another eNB via data/control path 15, which may be implemented as the X2 interface shown in FIG. 1 The wireless network 1 can be assumed to include a RAN portion and a CN portion.

For the purposes of describing the exemplary embodiments of this invention the UE 10 can be assumed to also include a system information receiver and interpreter block 10E and the eNB 12 can include a system information composer and transmitter block 12E. The UE 10 can in some embodiments be capable of M2M communication (e.g., D2D communication) with at least one other UE device 10'.

An aspect of this type of operation can be machine-type communication (MTC), and such a device may be referred to as an MTC device. One publication of interest with respect to MTC devices is 3GPP TR 23.888 V1.0.0 (2010-07) Technical Report 3rd Generation Partnership Project; Technical Specification Group Services and System Aspects; System Improvements for Machine-Type Communications; (Release 10).

Each of the PROGs 10C and 12C is assumed to include program instructions that, when executed by the associated DP, enable the device to operate in accordance with the exemplary embodiments of this invention, as will be discussed below in greater detail. That is, the exemplary embodiments of this invention can be implemented at least in part by computer software executable by the DP 10A of the UE 10 and by the DP 12A of the eNB 12, or by hardware, or by a combination of software and hardware (and firmware).

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer-readable memories 10B and 12B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processors 10A and 12A may be of any type suitable to the local technical environment, and may include one or more of general purpose computers, special purpose computers, microprocessors, digital signal processors (DSPs) and processors based on multi-core processor architectures, as non-limiting examples.

In accordance with the exemplary embodiments of this invention information descriptive of an overload condition at the MME 14 is broadcast by the system information block 12E of the eNB 12 as system information. In response to receiving and interpreting the system information (at block 10E) the MTC UE 10 (or any UE) does not attempt to access the network. When the overload condition ends the concerned MME identifier is removed from the system information, indicating to the UE 10 that a network access attempt may be made. Additionally an information element (IE) that indicates what type or types of access are allowed can be included with the system information.

Reference with regard to system information and conventional RRC operation can be made to, for example, 3GPP TS 36.331 V10.0.0 (2010-12) Technical Specification 3rd Generation Partnership Project; Technical Specification Group Radio Access Network; Evolved Universal Terrestrial Radio Access (E-UTRA); Radio Resource Control (RRC); Protocol specification (Release 10). For example, section 5.2, System information, describes generally the system information and the actions that are performed in response to receiving System Information Blocks Types 1-13. Section 5.3 describes connection control. Reference with regard to conventional idle mode operation of the UE 10 can be made to, for example, 3GPP TS 36.304 V10.0.0 (2010-12) Technical Specification 3rd Generation Partnership Project; Technical Specification Group Radio Access Network; Evolved Universal Terrestrial Radio Access (E-UTRA); User Equipment (UE) procedures in idle mode (Release 10).

In order to avoid a network overload condition the identification of an overloaded MME 14 (or any network element) can be indicated in the system information messages. In response, MTC devices (having delay tolerant data available for transmission) or the UE 10 connected (registered) to the overloaded MME 14 (or any network element) do not attempt network access when the overload condition is indicated to the UE 10.

Note that while the information relating to an overloaded MME 14, or some other CN component, is described in the context of broadcast system information type of signaling, it is also within the scope of the exemplary embodiments to use dedicated signaling from the eNB 12 to one or more of the eNBs 10. The dedicated signaling could be accomplished using either access network or core network protocols.

If the overload information is provided as part of the system information a potentially large number of UEs 10 could become aware of the MME 14 becoming non-overloaded (overload condition is no longer applicable) at about same time. This can potentially cause a RAN overload if then some number of UEs 10 attempt to make a system access at about the same time. However, this condition can be dealt with by one or more of the following techniques.

The overload indication reporting can be enhanced/combined with EAB (or conventional access class barring), where a limit is placed on the number of UEs 10 connecting to the network when the MME 14 becomes available. In this manner not all of the UEs 10 would simultaneously attempt to connect to the network.

Alternatively some randomization of the time when UEs 10 are allowed to access the network, after the MME 14 becomes non-overloaded, can be used so as to temporally distribute the access requests.

The signaling in accordance with the exemplary embodiments can be enhanced by allowing the UE 10 to perform some specific activities, e.g., ATTACH, by an additional IE informing the UE 10 which kind of access is allowed. For example, the IE (sent as part of the system information or as part of the dedicated signaling) can indicate that only a high priority access is allowed, or that only a signaling-type of access is allowed. The signaling can also be enhanced to reject/allow only a subset of UEs 10 to access the network when the MME 14 is indicated as being overloaded. For example, 'normal' UEs, such as those involved in making a cellular voice or data call, can be allowed network access, but MTC devices are not allowed access. This information can also be broadcast in system information or sent via dedicated signaling from the eNB 12 to the UE 10.

Note that a 'normal' UE may also be capable of M2M or D2D operation. In either case, it can be the case that the UE data is delay tolerant.

Note also that the UE 10 can be aware of which MME it is connected with via NAS (non-access stratum) signaling. For example, reference can be made to 3GPP TS 24.301 V10.1.0 (2010-12) Technical Specification 3rd Generation Partnership Project; Technical Specification Group Core Network and Terminals; Non-Access-Stratum (NAS) protocol for Evolved Packet System (EPS); Stage 3 (Release 10). This can be accomplished by an attach procedure and tracking and updating procedure in an information element referred to as GUTI. (globally unique temporary identifier).

The use of the exemplary embodiments thus avoids the unnecessary UE 10 to eNB 12 signaling (e.g., RRC signaling) which loads the RAN and increases power consumption of the UE 10. That is, the signaling required in some of the conventional proposals, such as Random access request, Random access response, RRC Connection Request and RRC Connection Reject with extended wait time can be avoided. The use of the exemplary embodiments also enables the system to avoid signaling of a type: Random access request, Random access response, RRC Connection Request, RRC Connection Reject, RRC Connection Setup, RRC Connection Setup Complete, RRC Connection Release with extended wait time.

In addition, there is no unnecessary waiting time for the UE 10 as the network can indicate the current load situation in the system information, and can remove a 'recovered' MME 14 from the overloaded list. In this case the UE 10 can have knowledge immediately of the ability to perform a system access, and is not required to wait until some pre-specified wait time has expired (although the overload situation may have ended sometime earlier). This clearly makes more efficient use of the UE 10 and network resources.

Figure 3:
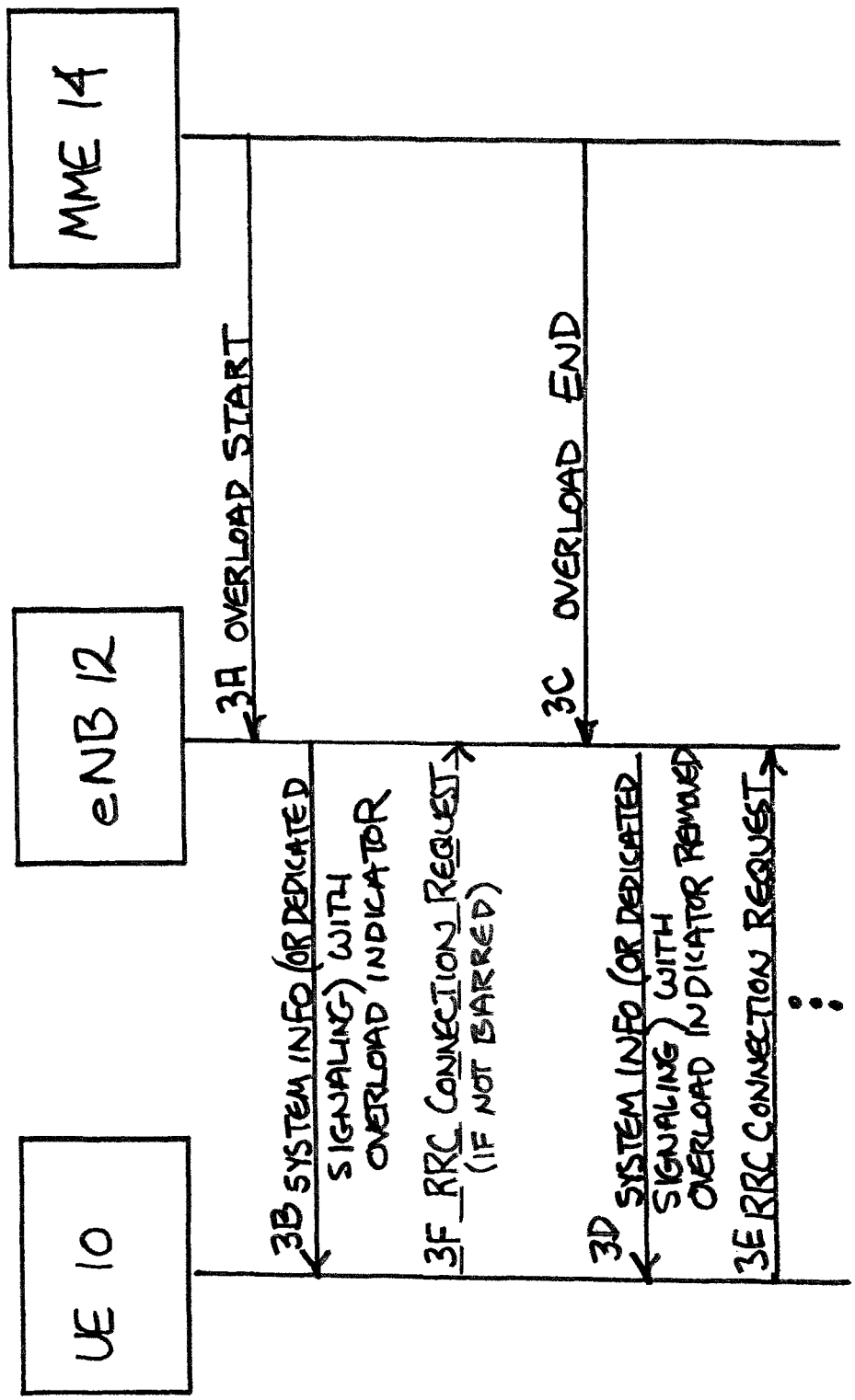
FIG. 3 is a signal flow diagram that is descriptive of the exemplary embodiments.

FIG. 3 is a signal flow diagram that is descriptive of the exemplary embodiments. At 3A the MME 14 sends (via the S1 interface 13 in an E-UTRAN embodiment) an overload start condition indicator to the eNB 12. At 3B the eNB 12, using broadcast system information or dedicated signaling, composes and sends information to the UE 10 that indicates the overload condition of the MME 14. At some future time 3C the MME 14 sends an overload end condition indicator to the eNB 12. At 3D the eNB 12, again using broadcast system information or dedicated signaling, composes and sends information to the UE 10 that indicates the end of the overload condition of the MME 14. At 3E, assuming that the UE 10 needs to connect to the system, initiates the system connection such as by sending an RRC Connection Request to the eNB 12. This is followed by conventional eNB/UE connection establishment signaling.

Note that in some embodiments the broadcast system information or dedicated signaling sent at 3B can contain additional information, such as an indication of what class or classes of UEs 10 are allowed or barred. In this case, and if the UE 10 is not barred, the UE 10 may make a connection request prior to receiving the end of the overload signaling at 3D. This connection request is shown by the dashed line 3F. Additionally, the eNB 12 when sending the overload end indication at 3D can include additional information, such as some value intended to temporally distribute the subsequent access requests made by the UEs 10, or some value specifying which class or classes of UEs 10 can make the initial access requests (e.g., 'normal' UEs versus M2M UEs).

Note also that if the system information signaling is used at 3B and 3D that an existing system information block (SIB) may be modified to include the additional information (IE(s)) indicating the overload start and end conditions (and possibly the other related information as discussed above). SIB1 is one suitable SIB for this purpose, as it conveys access-related information. However, a new SIB may be defined for this purpose. The same applies to the dedicated signaling if used.

Based on the foregoing it should be apparent that the exemplary embodiments of this invention provide a method, apparatus and computer program(s) to enhance overload operation of a wireless network by reducing signaling overhead while also reducing UE 10 power consumption. The exemplary embodiments enable the blocking of lower priority access attempts while still enabling higher priority and more critical types of network access attempts. The blocking can be adaptive to the actual network loading conditions, and can be enabled and disabled via a minimal amount of signaling (e.g., system information signaling) without requiring the use of less efficient blocking periods of pre-set durations. Note that the exemplary embodiments can also be used when the UE 10 is in the Connected mode and may thus affect the operation of the UE 10 during a call. Note also that the use of these exemplary embodiments enables the provisioning of network services in an optimal manner during emergency situations such as by allowing emergency services persons to system access while restricting the access of less critical users.

Figure 4:
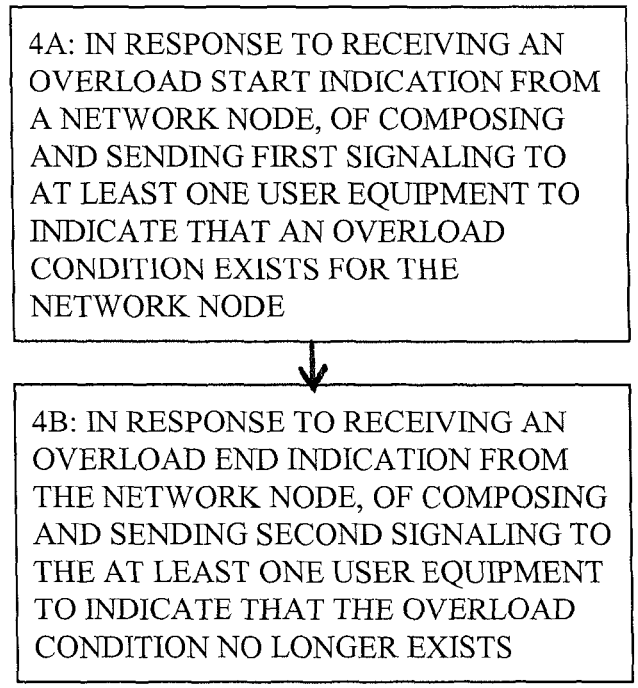
FIGS. 4 and 5 are each a logic flow diagram that illustrates the operation of a method, and a result of execution of computer program instructions embodied on a computer readable memory, in accordance with the exemplary embodiments of this invention.

FIG. 4 is a logic flow diagram that illustrates the operation of a method, and a result of execution of computer program instructions, in accordance with the exemplary embodiments of this invention. In accordance with these exemplary embodiments a method performs at Block 4A a step, in response to receiving an overload start indication from a network node, of composing and sending first signaling to at least one user equipment to indicate that an overload condition exists for the network node. At Block 4B there is a step, in response to receiving an overload end indication from the network node, of composing and sending second signaling to the at least one user equipment to indicate that the overload condition no longer exists.

Figure 5:
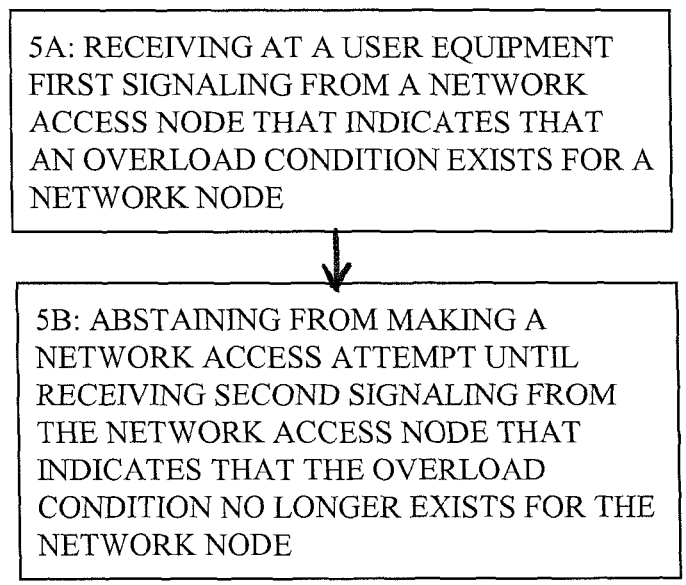

FIG. 5 is a logic flow diagram that illustrates the operation of a method, and a result of execution of computer program instructions, in accordance with the exemplary embodiments of this invention. In accordance with these exemplary embodiments a method performs at Block 5A a step of receiving at a user equipment first signaling from a network access node that indicates that an overload condition exists for a network node. At Block 5B there is a step of abstaining from making a network access attempt until receiving second signaling from the network access node that indicates that the overload condition no longer exists for the network node.

The various blocks shown in FIGS. 4 and 5 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention. For example, while the exemplary embodiments have been described above in the context of the E-UTRAN system, it should be appreciated that the exemplary embodiments of this invention are not limited for use with only this one particular type of wireless communication system, and that they may be used to advantage in other wireless communication systems, including further releases of the E-UTRAN system (e.g., LTE-Advanced or LTE-A). The exemplary embodiments could be used, for example, in the UTRAN system and in this case certain specifications of interest can include, for example, 3GPP TS 25.304 V9.3.0 (2010-09) Technical Specification 3rd Generation Partnership Project; Technical Specification Group Radio Access Network; User Equipment (UE) procedures in idle mode and procedures for cell reselection in connected mode (Release 9), and 3GPP TS 25.331 V10.2.0 (2010-12) Technical Specification 3rd Generation Partnership Project; Technical Specification Group Radio Access Network; Radio Resource Control (RRC); Protocol specification (Release 10).

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, any names used for the described parameters are not intended to be limiting in any respect, as these parameters may be identified by any suitable names. Further, any names assigned to signaling protocols (e.g., RRC) are not intended to be limiting in any respect, as the protocols may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. An apparatus for controlling network access for at least one user equipment in a single wireless communication network comprising at least one network node and mobility management entities, comprising:
   a processor; and
   a non-transitory memory including computer program code, where the non-transitory memory and computer program code are configured to, with the processor, cause the apparatus,
   in response to a receipt of an overload start indication for restricting access to the single wireless communication network from the at least one network node, to compose and send first signaling to the at least one user equipment to indicate that an overload condition exists for the at least one network node, wherein the first signaling is configured to cause the at least one user equipment to abstain from making a network access attempt to the single wireless communication network; and
   in response to a receipt of an overload end indication from the at least one network node, to compose and send second signaling to the at least one user equipment to indicate that the overload condition no longer exists, where the first signaling comprises information to specify a subset of user equipments that are allowed to attempt network access.

2. The apparatus as in claim 1, where the first and second signaling comprise broadcast system information signaling.

3. The apparatus as in claim 1, where the first and second signaling comprise dedicated signaling.

4. The apparatus as in claim 1, where the first signaling comprises information to indicate what type of network access is allowed to the at least one user equipment.

5. The apparatus as in claim 1, where at least one of the first signaling or the second signaling comprises information to limit a number of user equipment that attempt network access.

6. The apparatus as in claim 1, where at least one of the first signaling or the second signaling further comprises information to randomize times when the at least one user equipment is allowed to access the single wireless communication network.

7. The apparatus as in claim 1, where the overload start indication and the overload end indication are received at the apparatus from at least one of the mobility management entities.

8. An apparatus, for controlling network access in a single wireless communication network comprising at least one network node and mobility management entities, comprising:
   a processor; and
   a non-transitory memory including computer program code, where the non-transitory memory and computer program code are configured to, with the processor, cause the apparatus,
   in response to a receipt at the apparatus of first signaling from the at least one network node that indicates that an overload condition for restricting access to the single wireless communication network exists for the at least one network node, to abstain from making a network access attempt to the single wireless communication network until second signaling is received from the at least one network node that indicates that the overload condition no longer exists for the at least one network node,
   where the first signaling comprises information to specify a subset of user equipments that are allowed to attempt network access.

9. The apparatus as in claim 8, where the first and second signaling comprise broadcast system information signaling and where at least one of the first signaling or the second signaling further comprises signaling indicating a further subset of the subset of user equipments that can attempt network access.

10. The apparatus as in claim 8, where the first and second signaling comprise dedicated signaling.

11. The apparatus as in claim 8, where the first signaling comprises information to indicate what type of network access is allowed to the apparatus, and where the non-transitory memory and computer code are further configured to, with the processor, cause the apparatus to make a network access attempt prior to receiving the second signaling to make an allowable type of network access.

12. The apparatus as in claim 8, where at least one of the first signaling or the second signaling comprises information to limit a number of user equipment that attempt network access.

13. The apparatus as in claim 8, where at least one of the first signaling or the second signaling comprises information to temporally distribute network access attempts from user equipment.

14. The apparatus as in claim 1, wherein machine-type communication devices are barred from attempting network access.

15. The apparatus as in claim 1, where the overload start indication further includes extended access barring.

16. The apparatus as in claim 1, where the overload start indication prevents signaling from the at least one user equipment to the at least one network node.

17. The apparatus as in claim 1, where the second signaling comprises the information to specify the subset of user equipments that can attempt network access.

18. The apparatus as in claim 1, wherein the apparatus is part of the single wireless communication network.

\* \* \* \* \*